(12) United States Patent
Seymour

(10) Patent No.: US 12,455,185 B2
(45) Date of Patent: Oct. 28, 2025

(54) DEVICE FOR INDICATING A LIQUID LEVEL IN A LIQUID CONTAINER

(71) Applicant: Nicholas Seymour, Footscray (AU)

(72) Inventor: Nicholas Seymour, Footscray (AU)

( * ) Notice: Subject to any disclaimer, the term of this patent is extended or adjusted under 35 U.S.C. 154(b) by 333 days.

(21) Appl. No.: 18/040,329

(22) PCT Filed: Aug. 2, 2021

(86) PCT No.: PCT/AU2021/050841
§ 371 (c)(1),
(2) Date: Feb. 2, 2023

(87) PCT Pub. No.: WO2022/027090
PCT Pub. Date: Feb. 10, 2022

(65) Prior Publication Data
US 2023/0358592 A1    Nov. 9, 2023

(30) Foreign Application Priority Data

Aug. 3, 2020 (AU) ................................ 2020902710

(51) Int. Cl.
*G01F 23/68*    (2006.01)
*A01K 7/00*    (2006.01)
*G01F 23/70*    (2006.01)
*G01F 23/80*    (2022.01)

(52) U.S. Cl.
CPC ............... *G01F 23/70* (2013.01); *A01K 7/00* (2013.01); *G01F 23/68* (2013.01); *G01F 23/802* (2022.01)

(58) Field of Classification Search
CPC ........ G01F 23/70; G01F 23/802; G01F 23/80; G01F 23/0007; G01F 23/64; G01F 23/30; G01F 15/06; G01F 23/66; G01F 23/68; G01F 23/683; G01F 23/76; A01K 7/00
USPC .......... 340/623; 73/305–308, 313, 314, 322.5
See application file for complete search history.

(56) References Cited

U.S. PATENT DOCUMENTS

2015/0287313 A1* 10/2015 Silvers ................ G01F 23/683
340/618

FOREIGN PATENT DOCUMENTS

AU    2020100150 A4    3/2020
EP    2223177 B1 *    4/2020    ......... G01F 23/0084

OTHER PUBLICATIONS

International Search Report and Written Opinion for PCT Application No. PCT/AU2021/050841, Dated Oct. 15, 2021, 11 pages.

\* cited by examiner

*Primary Examiner* — Robert R Raevis
(74) *Attorney, Agent, or Firm* — Christopher R. Christenson; Kelly; Holt & Christenson, P.L.L.C.

(57) ABSTRACT

This invention relates to a device for indicating liquid level in a liquid container by wirelessly communicating the angle of inclination of the device, and by inference the level of liquid in the container relative to a predetermined low level point. The same embodiment can be deployed in shallow or deep liquid containers as free-floating in the former, or tethered to a fixed point in the latter, to facilitate remote monitoring of the liquid level. The device can be easily moved to new locations without the use of tools or fixings with the location of the device updated on the remote user interface via GPS data transmitted with the sensor data.

15 Claims, 6 Drawing Sheets

[Fig. 1]
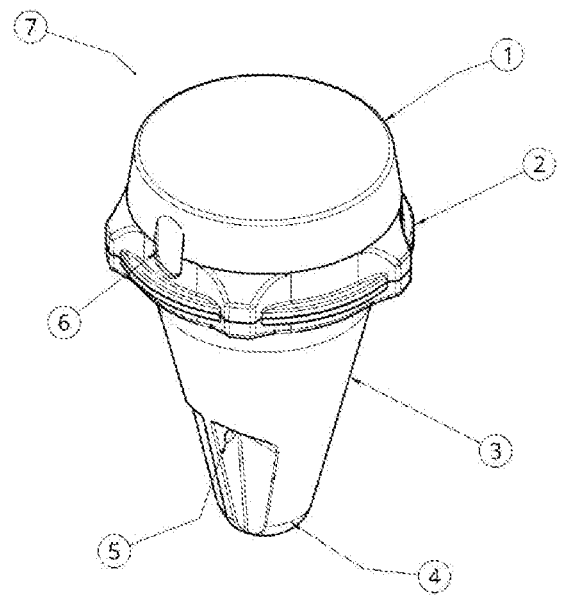
[Fig. 2]
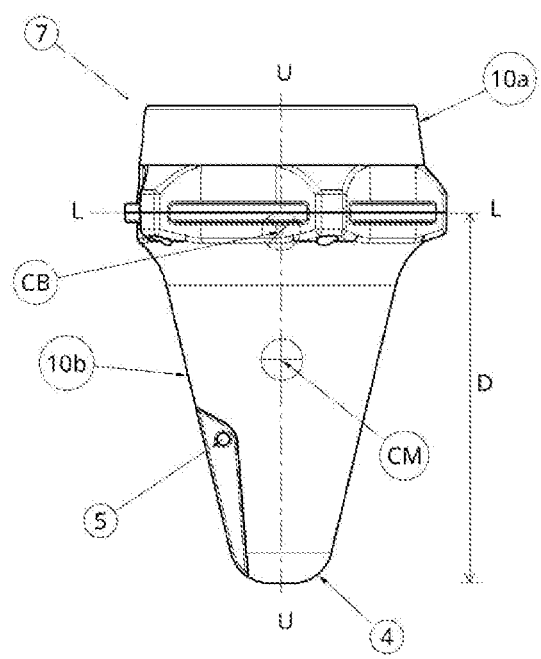

[Fig. 3]
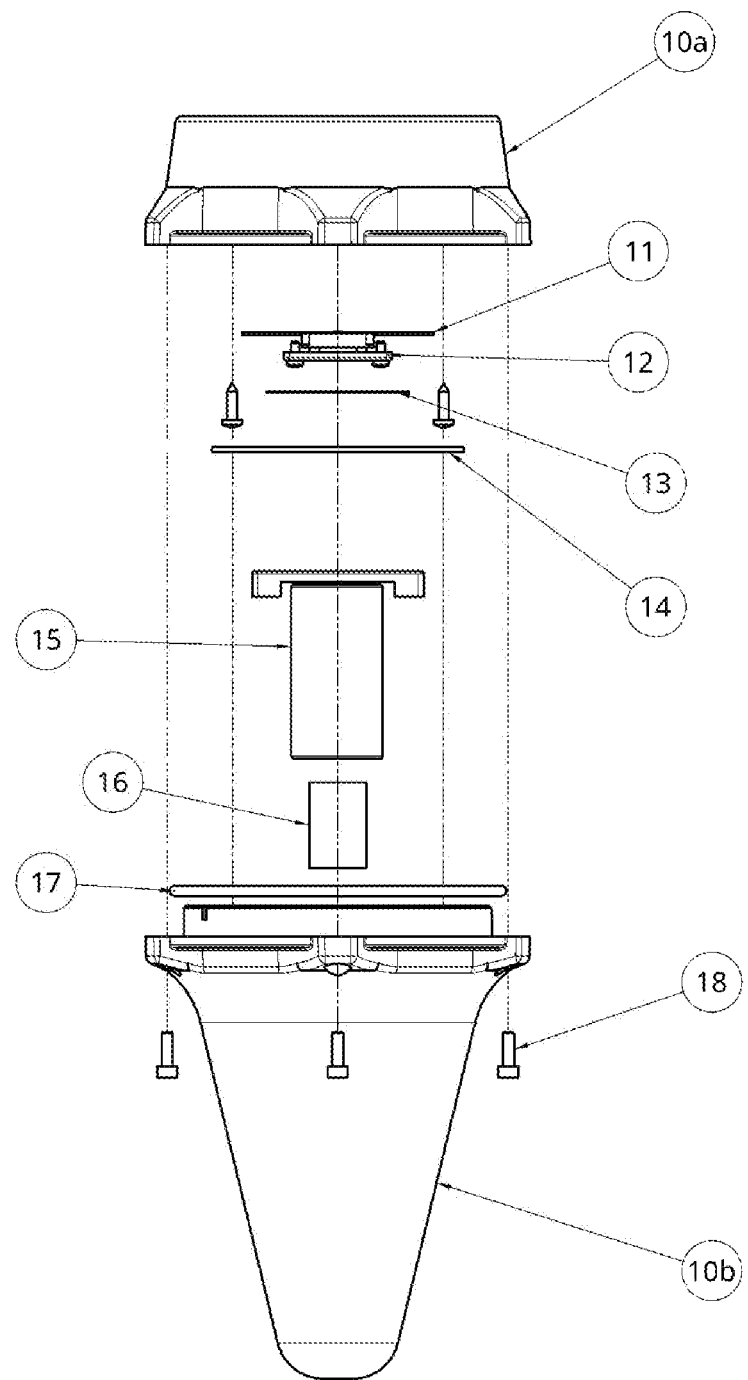

[Fig. 4]
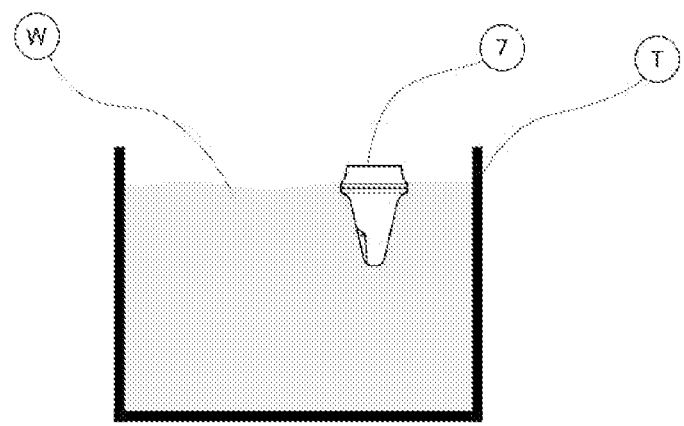
[Fig. 5]
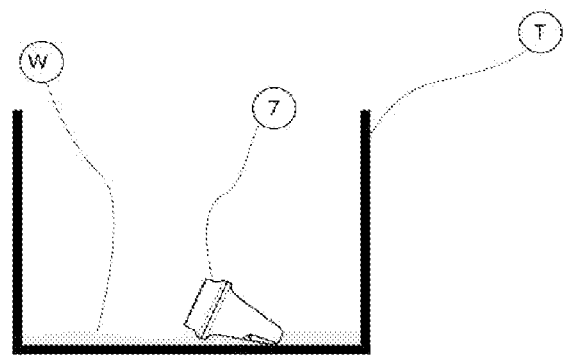

[Fig. 6]
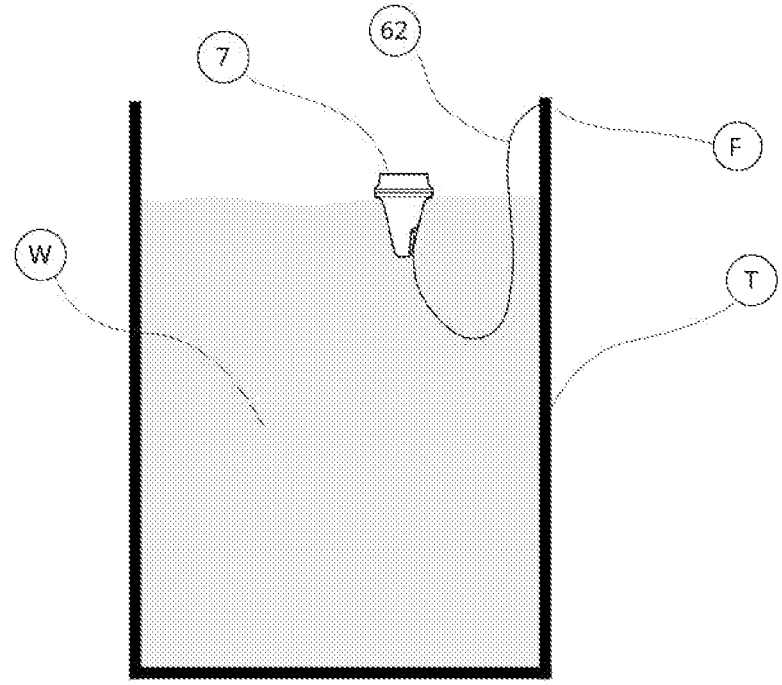
[Fig. 7]
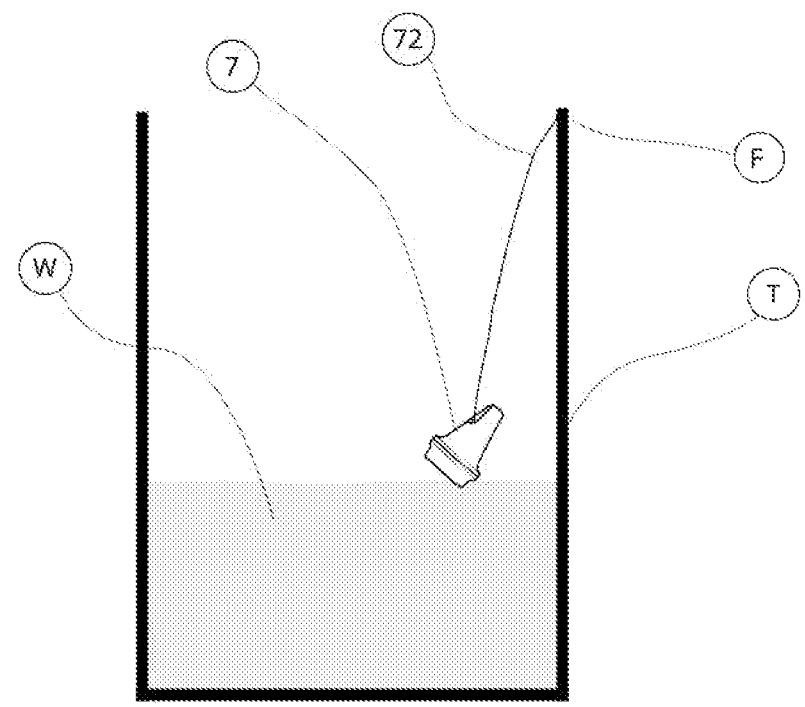

[Fig. 8]
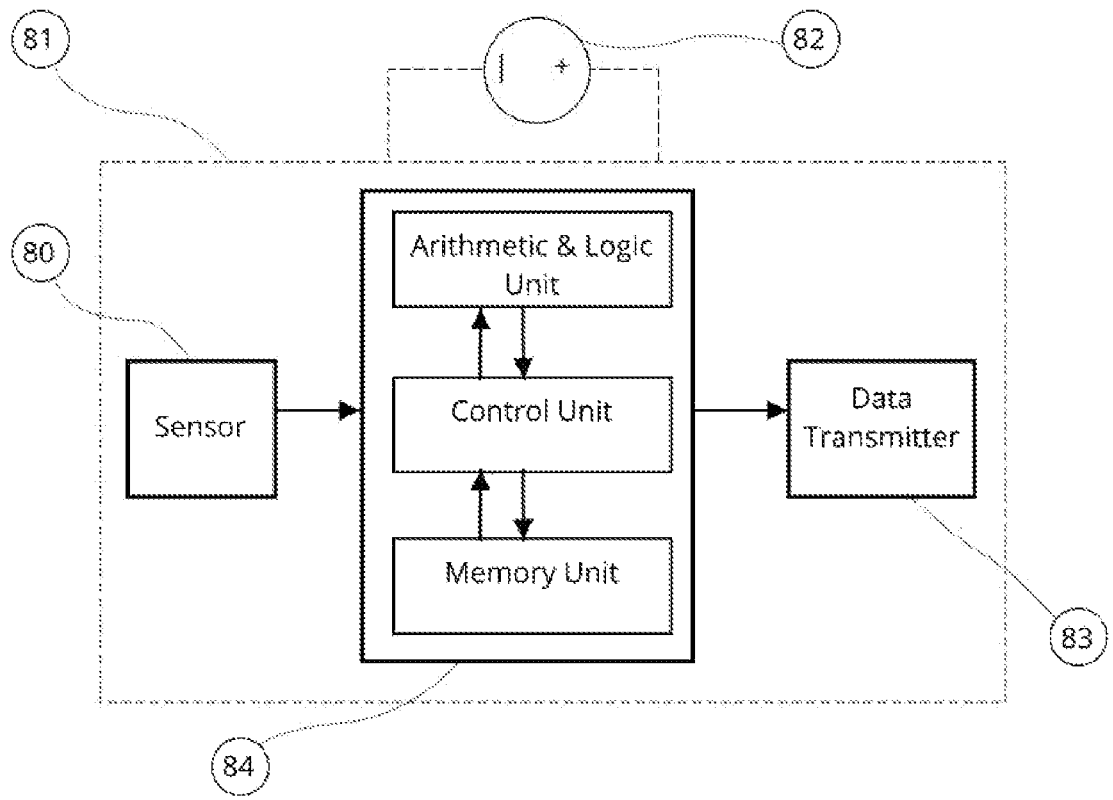
[Fig. 9]
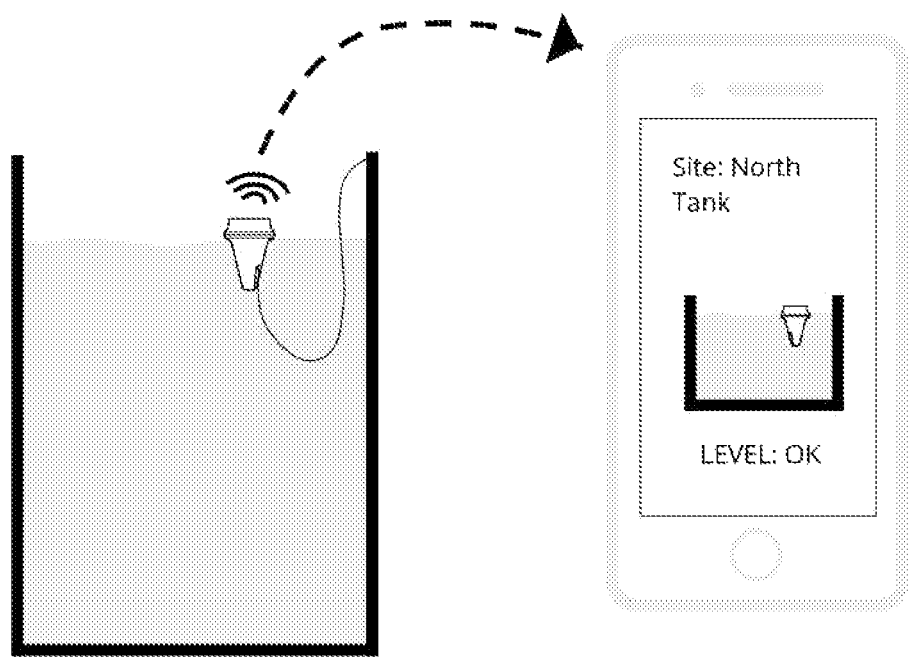

[Fig. 10]
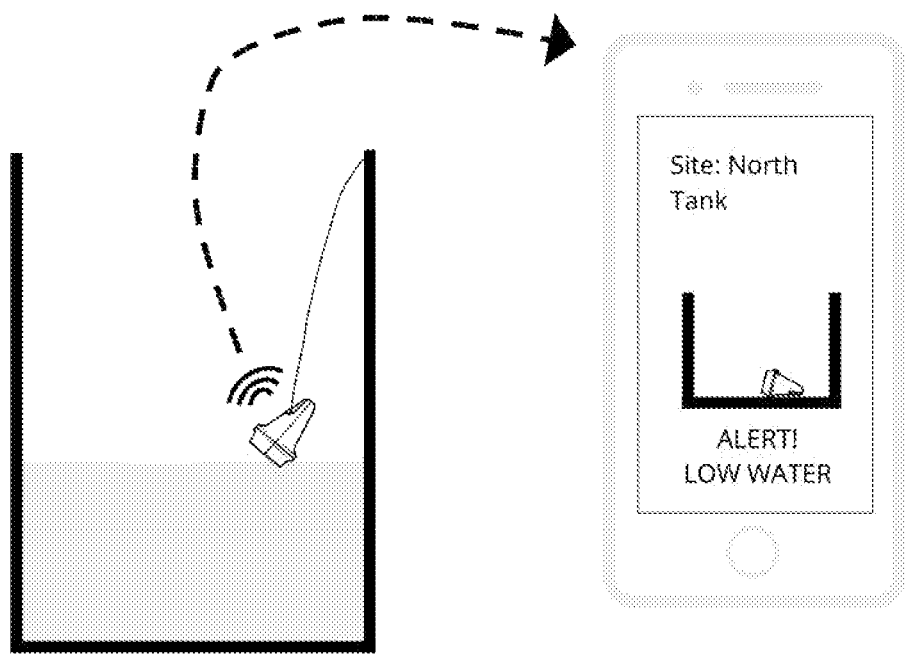

DEVICE FOR INDICATING A LIQUID LEVEL IN A LIQUID CONTAINER

This application is a Section 371 National Stage Application of International Application No. PCT/AU2021/050841, filed on Aug. 2, 2021, which claims priority to Australian Patent Application No. 2020902710 entitled "A DEVICE FOR INDICATING A LIQUID LEVEL IN A LIQUID CONTAINER" filed on Aug. 3, 2020, the contents of which are incorporated herein by reference in their entirety.

TECHNICAL FIELD

This invention relates to a device for indicating a liquid level in a liquid container.

BACKGROUND ART

Liquid can be contained in natural or artificial containers. Natural containers include lakes, ponds and waterways; and artificial containers include storage reservoirs, tanks, troughs and channels. It is also known to modify tracts of land to create artificial containers.

It is known to provide devices that can show the level of liquid within a liquid container to facilitate management of the volume of liquid within that container. In the case of artificial containers that have a mechanical device to effect and/or control the supply of liquid to the container, failure of the mechanical device can result in an insufficient quantity of liquid in the container. Similarly, blockages in liquid supply lines to the container can prevent or inhibit flow of liquid to the container, which can also result in an insufficient quantity of liquid in the container.

As will be apparent, the height of the surface level of liquid within a container, relative to a fixed datum, is indicative of the volume of liquid within that container. Accordingly, the liquid level is often used to represent the volume of liquid within a container relative to a maximum capacity.

One very simple liquid level indicator is a post with markers in a vertical arrangement to indicate the depth of the body of water by the vertical position of the liquid surface level against the markers. Another simple indicator that is suitable for a tank has a float, a counterweight, a string that interconnects the float and counterweight, and also passes over a pulley that is at the top of the tank wall such that both the float and counterweight can move vertically. This indicator has the float floating on the surface of the liquid, and the counterweight externally of the tank. The length of the string is selected such that the counterweight is at its lowest position when the tank is full (and the float near the top of the tank), and at its highest position when the tank is empty (and the float on the floor of the tank). As will be appreciated, these types of indicators require manual inspection of the indicator to determine the liquid level.

To mitigate the need for manual inspection, it is known to use electronic devices with sensors that are configured to sense a condition associated with the liquid level within the container. By way of example, it is known to use an ultrasound transducer that directs ultrasonic energy towards the surface of the liquid. Ultrasonic energy is reflected from the surface of the liquid (in other words, from the air-water interface), and the transducer receives reflected ultrasonic energy. The time between the emitted ultrasound energy and its reflection received at the transducer represents the distance of the liquid surface from the transducer. The data obtained from the sensors can be transmitted wirelessly from the electronic device to other electronic interfaces, which can facilitate remote monitoring of the liquid level in the container.

The electronic devices can require significant time and skill in installing, calibrating, and maintaining the device to ensure data provided by the device is reliable. There is a need to address the above, and/or at least provide a useful alternative.

SUMMARY OF INVENTION

This invention is a electronic circuit, power source, communication module and sensor element mounted within a waterproof housing that is configured to float upright on the surface of a contained liquid until the liquid level drops to point that:
  the submerged portion of the device touches the bottom and tilts over; or
  in deeper liquid containers, a tether attached to the device and fixed to the top of the container reaches full extension as the liquid level falls, causing the device to tilt over.

A sensing element, in this embodiment an accelerometer, detects the tilting action and an output signal is transmitted wirelessly, alerting the remote monitor to the status of the liquid level.

In the free floating embodiment, the device can be picked up and moved to a new location without the use of tools or fixings. The location of the device will be updated via the GPS location data transmitted with the sensor data.

Technical Problem

The invention is trying to solve technical problems in the field that include:
  signal output from the device may be disrupted by the material construction of the liquid container,
  some liquid containers such as trough will be shallow in depth and require an alert when the level reaches near to the bottom, while larger containers such as tanks will require the low level to be alerted when liquid level is not low enough to allow the device to touch the bottom and tilt over,
  any floating device that relies on tilting can be subject to catching or becoming trapped in the upright position due to irregularities in the surface of the liquid container,
  if animals are drinking directly from the liquid container they may grab the device in their mouths and remove it from the container,
  in some situations when many animals are drinking from a trough at the same time, the liquid level would reach the low level for a short period of time as part of normal operations and not require an alert message,
  the ease of movement of the device from one location to the next could cause confusion as to the location of the device and the liquid container being measured.

Solution to Problem

The invention solves the issue of signal disruption caused by the material of the liquid container by combining narrow band or satellite technology with a positioning of the antenna in the highest part of the housing.

For liquid containers where it is required to alert the low level before the device comes into contact with the bottom surface, an attachment point has been included on the housing at a location below the center of balance such that when a tether is fixed to the top of the container and then also to the device at the attachment point, the device will, when the liquid level drops to a level such that the tether is at full extension, tilt over and trigger a low level alert transmission.

In situations where the device is floating freely and relying on contact with the bottom of the liquid container to tilt over, the risk of catching on a surface irregularity, wedging into a crevice or falling into a corner is mitigated by the wide round shape at the base of the device.

The size and smooth shape of the device is such that animals in their playful curiosity are not able to forcefully grip the device in their mouths and remove it from the liquid container.

The trigger values for the alert transmission is able to be configured according to both the angle of the tilt, and the time period for which the device remains tiled past the specified angle.

Advantageous Effects of Invention

The invention is technically superior to the prior art in that it can be deployed in both small (troughs for example) and large (tanks for example) liquid containers.

The use of narrow band or satellite communication technology allows for long distance communication that cannot be achieved with devices using technologies such as Wi-Fi or LoRaWAN that would require an external antenna system to maintain reliable communication.

A smooth rounded cone shape is less likely than long, narrow, or angular shapes to wedge or become trapped in the liquid container surface. This is most important in preventing the false reporting of a normal state, as a device that is physically trapped is not able to tilt over and send an alert as the liquid level drops.

The use of a flexible tether is an improvement on systems using mechanical arms in that it requires less tools to install and can easily be customised by shortening or lengthening the tether. Devices can be moved between liquid containers of the same design, but also with the addition or removal of a tether, to different types of liquid containers.

By combining the information on tilt angle and the time period for which the trigger angle has been exceeded there are less irrelevant alerts transmitted when the device is tilting over for short periods under normal conditions.

BRIEF DESCRIPTION OF DRAWINGS

FIG. 1 is an isometric view of the Device for Indicating a Liquid Level in a Liquid Container.

FIG. 2 is a side view of the Device for Indicating a Liquid Level in a Liquid Container.

FIG. 3 is an exploded view of the Device for Indicating a Liquid Level in a Liquid Container.

FIG. 4 and FIG. 5 are schematic drawings to explain how the invention works in a smaller container of liquid FIG. 6 and FIG. 7 are schematic drawings to explain how the invention works in a larger container of liquid FIG. 8 is a block diagram of the electronic circuit of the invention.

FIG. 9 and FIG. 10 are schematic drawings to explain how the water level is displayed on a mobile phone.

DESCRIPTION OF EMBODIMENTS

FIGS. 1 to 2 show an indicator device 7 that is suitable for use indicating a liquid level in a liquid container. The indicator 7 has particular application in indicating the level of water W in a tank T, as indicated schematically in FIGS. 4 to 7.

The indicator 7 includes a waterproof housing comprised of a moulded plastic lower portion 10 $b$ and upper portion 10 $a$, within which an electronic circuit 84 is mounted. The electronic circuit 81, which is shown by way of block diagram in FIG. 8, includes a sensor 80, and a processor 84 that receives electronic outputs from the sensor 80. A data transmitter 83 receives information generated by the processor 84, and transmits wireless electronic signals. A power supply 82 provides electrical power within the circuit 81. Functional aspects of the indicator 7 are discussed in further detail below, in reference to FIGS. 4 to 6.

In this embodiment, the waterproof housing includes an upper portion 10$a$, and a lower portion 10$b$. The upper and lower portion are sealed in a water-tight manner, thus keeping the internal cavity free from water ingress.

Components within the sealed enclosure are shown in FIG. 3. The indicator 7 includes a radio antenna 11, GPS module 12, circuit boards 13 and 14, battery 15 and ballast 16. An o-ring 17 creates the water proof seal under pressure of the fasteners 18 securing the two portions 10$a$ and 10$b$ together.

Further, as shown in FIG. 2, the lower portion 10$b$ has a generally cone-shaped lateral surface. The bottom end region 4 of the indicator 7 forms a spherical segment. In this particular example, ballast 16 of the indicator 7 is internal to the lower portion 10$b$, and thus is not visible externally.

It will be apparent from FIGS. 1 and 2 that the external surfaces of the indicator 7 are such that the indicator 7 is substantially rotationally symmetrical about the dashed-dot line U that extends the Centers of Mass and Buoyancy CM, CB, but for the formation of the attachment point 5 within lower portion 10$b$.

The indicator 7 is positively buoyant in the water W. Further, the buoyancy of the indicator 7 is configured so that, when the indicator 7 is free-floating in water W, the portion 10$b$ of the indicator 7 is submerged, and an upper portion 10$a$ of the indicator 7 is above the surface of the water W. FIG. 2 include dashed line L, which is the position of the surface line of the water W when the indicator 7 is free floating in water W. Correspondingly, the indicator has a draft depth D, which is the vertical separation of the bottom of the indicator 7 and the surface line L when the indicator 7 is free-floating.

It will be understood that throughout this specification and the claims that follow, unless the context requires otherwise, the term "free-floating" will be understood to relate to an item being in a static condition, in liquid that is still, and not subjected to applied external forces/loads.

The weight of the ballast 16 is selected such that the housing upper portion 10$a$ is substantially above the surface line L.

FIG. 2 also shows the position of the Center of Mass CM and the Center of Buoyancy CB of the indicator 7, and also a dashed-dot line U that extends the Centers of Mass and Buoyancy CM, CB. When the indicator 7 is free-floating in water, the Center of Buoyancy CB is vertically above the Center of Mass CM, and the line U is aligned with vertical. The indicator 7 is in an inclined orientation when the line U is not parallel with vertical. An angle of inclination of the indicator 7 is defined by the angle between the line U and vertical.

FIG. 4 shows the indicator 7 free-floating in water W in a tank T. In this Figure, the angle of inclination is 0°.

As will be apparent from FIG. 2, the largest diameter of the indicator 7 is approximately at the interface between the lower and upper portions. The bottom end region 4 of the lower portion of the indicator 7 is shaped so that when placed on a hard, horizontal surface with the bottom end in contact with that horizontal surface, the indicator 7 is inherently unstable. It will be appreciated that as the indicator 7 is lowered onto a horizontal surface, the bottom end region 4 will make first contact with that horizontal surface. By virtue of the curvature of the surface at the bottom end region 4, when the depth of water W in which the indicator 7 is located is less than the draft depth D, the indicator 7 will tilt over, adopting an inclined orientation. As the depth of water shallows from the draft depth D and the buoyancy forces on the indicator 7 decrease, the indicator 7 continues to tilt and the angle of inclination increases. Conversely, as the depth of water increases, the buoyancy forces on the indicator 7 increase and the indicator 7 rights, and the angle of inclination reduces.

In this particular example, the indicator 7 is stable when supported at the bottom end region 4, and at the widest point of the housing 2. FIG. 5 shows the indicator 7 in the tank T with water W that is so shallow that the indicator 7 is supported on the floor of the tank T in this manner. In FIG. 5, the indicator 7 is at an angle of inclination of approximately 60°.

5 The electronic outputs of the sensor 80 represent a distinct condition of the sensor 80 within the environment surrounding the indicator 7. In the embodiment shown in FIGS. 1 to 7, the electronic outputs are a function of the inclination of the indicator 7 with respect to vertical.

In the embodiment shown in FIGS. 1 and 2, the sensor 80 is an accelerometer, and the condition sensed by the sensor 80 is the inclination of the sensor 80 with respect to gravity. Mounting of the sensor 80 in a fixed position within the housing has the result that the angle of the sensor 80 correlates with the angle of inclination of the indicator 7.

The sensor 80 of this example includes an integrated circuit with an accelerometer. However, it will be appreciated that there are many alternative interface types that may be adopted.

As represented in FIG. 8 the electronic outputs from the sensor 80 are received by the processor 84. Based on the received electronic output, the processor 18 generates information that is then passed to the data transmitter 83. Typically, the generated information would include a digital code. The data transmitter 83 then transmits a wireless electronic signal that represents the received generated information. As described in further detail below, the transmitted wireless signals can be used within an electronic network to provide information for remote monitoring of the water level within the tank T.

In FIG. 4 the data transmitted is indicative of the indicator 7 free-floating in water W within the tank T, since this is the orientation of the indicator 7 in this state. This information can be relayed within the electronic network to indicate to those responsible for managing water levels in the tank T that the water level is "OK"; that is, the water level in the tank T is above the predetermined depth, which is considered to be acceptable.

In FIG. 5 the data transmitted is indicative of the indicator 7 inclined at an angle on the bottom of the tank T, since this is the orientation of the indicator 7 in this state where the water level is less than the draft depth D. When the depth of the water W is less than the draft depth D, there is upward force of the floor of the tank T against the bottom end region 4. The inherent instability of the indicator 7 in this condition will cause the indicator 7 to tilt. When the depth of the water W is at the depth (or shallower), such that the indicator 7 will adopt an orientation in which the angle of inclination is greater than a predetermined amount, the indicator 7 will transmit a wireless electronic signal that represents the angle of inclination. This information can be relayed within the electronic network to indicate to those responsible for managing water levels in the tank T that the water level is "LOW"; that is, the water level in the tank T is at or below the predetermined depth.

It will be appreciated that the indicator 7 provides a two-state indication of the water level within the tank T. These two states are that the water level is considered acceptable, and that the water level is at or below the acceptable level.

FIGS. 6 and 7 show an indicator device 7 in a larger liquid container, where the predetermined level at which those managing the water levels need to be informed, is higher than the draft D of indicator 7. The indicator 7 includes an attachment point 5 to which a tether is attachable. As shown in FIGS. 1 and 2, the attachment point 5 is positioned within the lower portion of the indicator 7. Further, the attachment point 5 is closer to the bottom end region 4 of the indicator 7 than the Center of Mass CM. In this particular example, the attachment point 5 is in the form of a hole that moulded into the lower portion of the housing 10b.

FIGS. 6 and 7 show a tether 62 that is attached at one end to the indicator 7, and at its opposing end to a fixed location F such that the tether 62 extends downwardly from the top of the wall of the tank T, and into the tank T. The fixed location F can be any convenient point, such as the top of the wall of the tank T, if desired.

An effective portion of the tether 62 is the length portion that extends between the indicator 7, and the fixed location F relative to the tank T. In the example of FIGS. 6 and 7, the fixed location F is at the top of the tank wall, and hence the effective portion is the part of the tether 62 that extends between the top of the tank wall and the indicator 7. As will be apparent, where the length of the effective portion is less than the vertical height of the fixed location F (in other words, the distance between the fixed location F and the closest point on the floor of the tank T), when the buoyancy forces are removed, the indicator 110 will be suspended by the tether 62 within the tank T.

By selecting the length of the effective portion that is less than the internal height of the wall of the tank T, a predetermined water level (in other words, a predetermined minimum depth) can be selected at which the tether 62 becomes subject to weight of the indicator 7. As the weight of the indicator 7 transfers onto the tether 62 (due to the water level falling, and the buoyancy forces on the indicator 7 decreasing), the indicator 7 will tilt due to relative positions of the attachment point 5 and the Center of Mass CM.

When there are no buoyancy forces acting on the indicator 7, the indicator 7 will be vertically supported solely by the tether 62. In this scenario, which is illustrated in FIG. 7, the orientation of the indicator 7 is inverted, relative to its free-floating orientation. The angle of inclination of the indicator 110 in this inverted orientation will be approximately 180°; in other words, the Center of Mass CM will be substantially vertically above the Center of Buoyancy CB (and the line U substantially parallel with vertical).

When the indicator 7 is free-floating in water W as in FIG. 4, the indicator 7 performs substantially identically as the indicator 7 free-floating in water W within the tank T as in FIG. 6, notwithstanding the attachment of the tether 62 to the indicator 7. With respect to the geometry, the length between the attachment point 5 and the Center of Buoyancy CB is a significant factor.

It will be appreciated that in some alternative examples the indicator 7 would be used in a body of water formed on earth, such as a dam or an open channel. In this example, a structure beside the body of water would provide the fixing point for attaching the tether 72.

As described above, the level of water W within the tank is inferred from electronic output of the sensor 80. In certain embodiments, the indicator 7 can broadcast wireless electronic signals when the water level transitions past a predetermined angle of inclination (as determined by the processor, based on the sensor output), and/or at intervals.

Data received from the indicator 7 will be passed via network telecommunications to an internet enabled server that is also connected to a mobile device and/or a computer. As indicated in FIGS. 9 and 10, information generated by, and transmitted from the indicator 7 can be displayed on a dashboard on the screen of a mobile phone and/or a computer.

FIG. 9 shows the indicator 7 in the free-floating in water W, such that the sensor 80 determines the angle of inclination less than the predetermined amount indicating a low water level. Accordingly, the dashboard shown on the mobile device contains information that uniquely identifies the tank, and shows information representative of the transmitted information from the indicator 7. Accordingly, the dashboard includes an icon of the indicator in a tank that is full of water, and also the words "Level: OK" or some equivalent.

FIG. 10 shows the indicator 7 hanging on the end of the tether, above the water level, such that the sensor 80 determines the angle of inclination more than the predetermined amount indicating a low water level. Accordingly, the dashboard shown on the mobile device contains information that uniquely identifies the tank, and shows information representative of the transmitted information from the indicator 7. Accordingly, the dashboard includes an icon of the indicator in a tank that is empty of water, and also the words "ALERT: Low Water" or some equivalent.

As will be appreciated, the indicator can provide information representative of the liquid level within a container without having to visually inspect the container and liquid level.

It will be understood that alternative wireless communication systems and protocols may be employed, as appropriate and/or required by various external factors.

Some embodiments of the indicator 7 can use one or more sensing elements that individually and/or collectively have two (or more) discrete states at various ranges of the angle of inclination, or in another condition associated with the environment surrounding the device.

In one such example, an indicator can have a sensing element in the form of a mercury tilt switch that has two states: open and closed. The tilt switch can be arranged within the housing of the indicator to transition between the two states at a predetermined angle of inclination.

Alternatively or additionally, the housing of an indicator can include a port that is located within the lower portion of the device, and so is submerged when the indicator is free-floating in liquid. An outer part of the sensing element is mounted with respect to the port such that the outer part is in communication with the environment surrounding the device. Appropriate positioning of the port having regard to the construction of the indicator can enable the port to be exposed (in other words, not submerged) in certain conditions that are associated with the indicator being in a predetermined low liquid level.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A device for indicating a liquid level in a liquid container, the device comprising:
   a waterproof housing that includes an upper portion and a lower portion, and
   an electronic circuit that is mounted within the housing, and that includes:
      at least one sensing element that is configured to output an electronic signal that represents a distinct condition of the sensing element within the environment surrounding the device,
      a processor that is in electronic communication with the sensing element so as to receive electronic outputs from the sensing element, and that generates information based on the received electronic output from the sensing element,
      a data transmitter for receiving generated information from the processor, and transmitting wireless electronic signals that represent received generated information, and
      a power supply for providing electrical power in the electronic circuit,
   wherein the device is configured to be positively buoyant in the contained liquid such that, when the device is free-floating, the lower portion is submerged and the upper portion is above the liquid level to thereby define a draft depth of the device,
   wherein the device is configured to adopt a substantially upright orientation when free-floating in liquid, and to adopt an inclined orientation when the liquid level within the container is less than the draft depth or predetermined depth,
   wherein the electronic outputs of the sensing element include an electronic output that is indicative of the device being in the substantially upright orientation, and a second electronic output that is indicative of the device being in the inclined orientation, and
   wherein the device further comprises an attachment point to which a tether is attachable, wherein the attachment point is positioned within the lower portion of the housing, and whereby the device is in a substantially inverted orientation compared with the upright orientation when the device is suspended by the tether.

2. The device according to claim 1, wherein the predetermined minimum depth is greater than the draft depth.

3. A device according to claim 1, wherein a notional straight line extends through the Center of Mass and the Center of Buoyancy of the device, and an angle of inclination of the device is defined by the angle between the notional straight line and vertical.

4. The device according to claim 2, wherein the predetermined minimum depth is determined by the length of the tether.

5. The device according to claim 1, wherein the electronic circuit is mounted internally within the housing such that the sensing element is in a fixed position relative to the housing.

6. The device according to claim 1, wherein the sensing element includes an accelerometer.

7. The device according to claim 1, wherein a bottom end region of the lower portion is shaped such that the device is unstable when placed on a hard, horizontal surface with the bottom end in contact with that horizontal surface, the bottom end region being a part of the lower portion that is furthest from the upper portion.

8. The device according to claim 7, wherein the bottom end region includes an end surface that is curved.

9. The device according to claim 7, wherein the bottom end region is of a fixed length which will determine the draft of the device in liquid.

10. The device according to claim 1, wherein at least part of the lower portion narrows in a direction away from the upper portion.

11. The device according to claim 1, wherein the external shape is too smooth and too wide to be lifted in the mouth of animals drinking at a water trough, despite their attempts to do so.

12. The device according to claim 1, wherein the lower portion of the housing includes a generally conical outer shell portion, wherein a ballast member is mounted internally of the outer shell portion.

13. The device according to claim 1, wherein the data transmitter is configured to transmit wireless signals in sub-gigahertz radio frequency bands.

14. The device according to claim 1, wherein the data transmitter is configured to transmit wireless signals in a narrowband communication protocol.

15. The device according to claim 1, wherein the data transmitter is configured to transmit wireless signals in a satellite communication protocol.

\* \* \* \* \*